United States Patent
Abe et al.

(10) Patent No.: US 9,583,788 B2
(45) Date of Patent: Feb. 28, 2017

(54) NONAQUEOUS ELECTROLYTIC SOLUTION AND ENERGY STORAGE DEVICE USING SAME

(71) Applicant: UBE INDUSTRIES, LTD., Ube-shi (JP)

(72) Inventors: Koji Abe, Ube (JP); Kazuhiro Miyoshi, Ube (JP); Masahide Kondo, Ube (JP)

(73) Assignee: UBE Industries, LTD., Ube-shi (JP)

( * ) Notice: Subject to any disclaimer, the term of this patent is extended or adjusted under 35 U.S.C. 154(b) by 300 days.

(21) Appl. No.: 14/352,551

(22) PCT Filed: Oct. 16, 2012

(86) PCT No.: PCT/JP2012/076660
§ 371 (c)(1),
(2) Date: Apr. 17, 2014

(87) PCT Pub. No.: WO2013/058224
PCT Pub. Date: Apr. 25, 2013

(65) Prior Publication Data
US 2014/0287325 A1     Sep. 25, 2014

(30) Foreign Application Priority Data
Oct. 17, 2011  (JP) ................................ 2011-227658

(51) Int. Cl.
| | | |
|---|---|---|
| H01M 10/0567 | (2010.01) | |
| H01M 4/587 | (2010.01) | |
| H01M 4/583 | (2010.01) | |
| H01M 4/48 | (2010.01) | |
| H01M 10/052 | (2010.01) | |
| H01M 10/0569 | (2010.01) | |
| H01G 11/58 | (2013.01) | |
| H01G 11/60 | (2013.01) | |
| H01M 4/58 | (2010.01) | |
| H01M 10/0525 | (2010.01) | |
| H01M 10/0568 | (2010.01) | |
| H01M 10/0566 | (2010.01) | |

(52) U.S. Cl.
CPC ........ H01M 10/0567 (2013.01); H01G 11/58 (2013.01); H01G 11/60 (2013.01); H01M 4/483 (2013.01); H01M 4/583 (2013.01); H01M 4/587 (2013.01); H01M 4/5825 (2013.01); H01M 10/052 (2013.01); H01M 10/0525 (2013.01); H01M 10/0569 (2013.01); H01M 10/0566 (2013.01); H01M 10/0568 (2013.01); Y02E 60/122 (2013.01); Y02E 60/13 (2013.01); Y02T 10/7011 (2013.01); Y02T 10/7022 (2013.01)

(58) Field of Classification Search
CPC ......... H01M 10/0567; H01M 10/0569; H01M 10/0568; H01M 10/052; H01M 10/0525; H01M 4/5825; H01M 4/483; H01M 4/583; H01M 4/587; Y02E 60/122
See application file for complete search history.

(56) References Cited

U.S. PATENT DOCUMENTS

| | | |
|---|---|---|
| 2008/0102375 A1 | 5/2008 | Shima |
| 2009/0226819 A1 | 9/2009 | Ihara et al. |
| 2010/0216036 A1 | 8/2010 | Shima |
| 2011/0052953 A1 | 3/2011 | Saito et al. |
| 2012/0040252 A1 | 2/2012 | Shima |
| 2012/0045698 A1 | 2/2012 | Shima |

FOREIGN PATENT DOCUMENTS

| | | |
|---|---|---|
| CN | 102005560 A | 4/2011 |
| JP | 2001 229730 | 8/2001 |
| JP | 2002-33015 A | 1/2002 |
| JP | 2006 164759 | 6/2006 |
| JP | 2007 35616 | 2/2007 |
| JP | 2009 245923 | 10/2009 |
| JP | 2011 48987 | 3/2011 |

OTHER PUBLICATIONS

Combined Office Action and Search Report issued Aug. 6, 2015 in Chinese Patent Application No. 201280051067.7 (with English Translation of Category of Cited Documents).
International Search Report Issued Jan. 22, 2013 in PCT/JP12/076660 Filed Oct. 16, 2012.

*Primary Examiner* — Laura Weiner
(74) *Attorney, Agent, or Firm* — Oblon, McClelland, Maier & Neustadt, L.L.P.

(57) ABSTRACT

A nonaqueous electrolytic solution prepared by dissolving an electrolyte salt in a nonaqueous solvent, wherein the nonaqueous electrolytic solution contains at least one kind of an isocyanate compound having an ester structure represented by the following general formula (I):

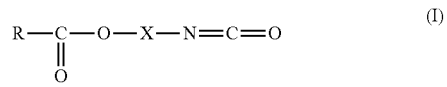

(wherein R represents an alkyl group, an alkenyl group, a $C_6$ to $C_{12}$ aryl group, an alkyloxy group, an alkenyloxy group, an isocyanatoalkyloxy group, or an aryloxy group in which at least one of the hydrogen atom may be substituted with a halogen atom. X represents a linear or branched alkylene group in which at least one of the hydrogen atom may be substituted with a halogen atom, or a bivalent linking group comprising at least one ether bond).

20 Claims, No Drawings

NONAQUEOUS ELECTROLYTIC SOLUTION AND ENERGY STORAGE DEVICE USING SAME

TECHNICAL FIELD

The present invention relates to a nonaqueous electrolytic solution that can improve the electrochemical properties in a broad temperature range and an energy storage device using the same.

BACKGROUND ART

In recent years, an energy storage device, particularly a lithium secondary battery is widely used for a small-sized electronic equipment such as a cellular phone and a laptop computer, an electric vehicle or storage of the electric power. These electronic equipments, vehicle or storage of the electric power is likely to be used in a broad temperature range of high temperature in the midsummer, low temperature in the arctic weather etc., and thus it is required to improve the electrochemical properties in a broad temperature range with a good balance.

Particularly in order to prevent global warming, it is urgently needed to cut $CO_2$ discharge, and immediate diffusion of a hybrid electric vehicle (HEV), a plug-in hybrid electric vehicle (PHEV), or a battery electric vehicle (BEV) is demanded, among environment-friendly cars loaded with an energy storage device including an energy storage device such as a lithium secondary battery and a capacitor. A vehicle has long migration length, and thus is likely used in a region of broad temperature range from tropical, very hot region to arctic weather region. Accordingly, these energy storage devices for a vehicle are demanded to have no deterioration for the electrochemical properties even when used in a broad temperature range from high temperature to low temperature.

Note that, in the present description, the term of the lithium secondary battery is used as a concept including the so-called lithium ion secondary battery.

A lithium secondary battery mainly consists of a positive electrode and a negative electrode containing materials which can absorb and release lithium, and a nonaqueous electrolytic solution including a lithium salt and a nonaqueous solvent, and as the nonaqueous solvent, a carbonate such as ethylene carbonate (EC) and propylene carbonate (PC) is used.

Further, as the negative electrode, metal lithium, and a metal compound (metal element, oxide, alloy with lithium, etc.) and a carbon material which can absorb and release lithium are known. Particularly, lithium secondary battery produced by using a carbon material, such as coke, artificial graphite, natural graphite and the like which can absorb and release lithium are widely put into practical use.

In a lithium secondary battery produced by using, for example, highly crystallized carbon materials, such as artificial graphites, natural graphites and the like as a negative electrode material, it is known that decomposed products and gases generated from a solvent in a nonaqueous electrolytic solution which is reduced and decomposed on a surface of a negative electrode in charging the battery detract from a desired electrochemical reaction of the battery, so that a cycle property thereof is worsened. Also, when the decomposed products of the nonaqueous solvent are deposited, lithium can not smoothly be absorbed onto and released from a negative electrode, and the electrochemical characteristics thereof are liable to be worsened in a broad temperature range.

Further, in a lithium secondary battery produced by using lithium metal and alloys thereof, metal element, such as tin, silicon and the like and oxides thereof as a negative electrode material, it is known that an initial battery capacity thereof is high but a nonaqueous solvent is acceleratingly reduced and decomposed as compared with a negative electrode of a carbon material since a micronized powdering of the material is promoted during cycles and that battery performances, such as a battery capacity and a cycle property are worsened to a large extent. Also, in a case the micronized powdering of the negative electrode material and the deposition of the decomposed products of the nonaqueous solvent are deposited, lithium can not smoothly be absorbed onto and released from the negative electrode, and the electrochemical characteristics thereof are liable to be worsened in a broad temperature range.

On the other hand, in a lithium secondary battery produced by using, for example, $LiCoO_2$, $LiMn_2O_4$, $LiNiO_2$, $LiFePO_4$ and the like as a positive electrode, it is known that decomposed products and gases generated from a solvent in a nonaqueous electrolytic solution which is partially oxidized and decomposed in a local part on an interface between the positive electrode material and the nonaqueous electrolytic solution in a charging state detract from a desired electrochemical reaction of the battery, so that the electrochemical characteristics thereof are worsened as well in a broad temperature range.

As described above, the decomposed products and gases generated when a nonaqueous electrolytic solution is decomposed on a positive electrode or a negative electrode may interfere with a migration of lithium ions or may swell the battery, and the battery performance is thereby worsened. In spite of the above situations, electronic equipments in which a lithium secondary battery are mounted are advanced more and more in multi-functionalization and tend to be increased in an electric power consumption. As a result thereof, a lithium secondary battery are advanced more and more in an elevation of a capacity, and a nonaqueous electrolytic solution is reduced in a volume thereof occupied in the battery, wherein the electrode is increased in a density, and a useless space volume in the battery is reduced. Accordingly, observed is a situation in which the electrochemical characteristics thereof in a broad temperature range are liable to be worsened by decomposition of only a small amount of the nonaqueous electrolytic solution.

Patent Document 1 proposes a nonaqueous electrolytic solution containing a specific compound having an isocyanate group together with carbonate having an unsaturated bond or a halogen atom, and suggests that the nonaqueous electrolytic solution improves the cycle property.

In addition, Patent Document 2 proposes a nonaqueous electrolytic solution containing a diisocyanate compound or monoisocyanate compound such as 1,6-diisocyanate hexane and ethyl isocyanate, and describes that the nonaqueous electrolytic solution improves the cycle property.

PRIOR ART DOCUMENTS

Patent Documents

Patent Document 1: Japanese Patent Publication No. 2007-035616

Patent Document 2: Japanese Patent Publication No. 2006-164759

SUMMARY OF THE INVENTION

Problem to be Solved by the Invention

The object of the present invention is to provide a nonaqueous electrolytic solution that can improve the electrochemical properties in a broad temperature range and an energy storage device using the same.

Means for Solving the Problems

The present inventors investigated in detail, the performances of the nonaqueous electrolytic solution of the prior arts described above. As a result, it cannot be said in the actual circumstances that the nonaqueous electrolytic solutions of the above Patent Documents can sufficiently solve the objects of improving electrochemical properties in a broad temperature range such as the discharge properties at low temperature after storage at high temperature.

Upon this, the present inventors have repeated the researches earnestly to solve the problems, and found that the electrochemical properties, particularly the electrochemical properties of a lithium cell in a broad temperature range, can be improved by means of a nonaqueous electrolytic solution in which an electrolyte salt is dissolved in a nonaqueous solvent, and which contains at least one kind of isocyanate having a specific ester structure in the nonaqueous electrolytic solution, whereby to complete the present invention.

Specifically, the present invention provides (1) to (1) to be described below.

(1) A nonaqueous electrolytic solution prepared by dissolving an electrolyte salt in a nonaqueous solvent, wherein the nonaqueous electrolytic solution contains at least one kind of an isocyanate compound having an ester structure represented by the following general formula (I):

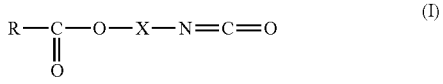

(wherein R represents a $C_1$ to $C_6$ alkyl group, a $C_2$ to $C_6$ alkenyl group, a $C_6$ to $C_{12}$ aryl group, a $C_1$ to $C_6$ alkyloxy group, a $C_2$ to $C_6$ alkenyloxy group, a $C_2$ to $C_6$ isocyanatoalkyloxy group, or a $C_6$ to $C_{12}$ aryloxy group in which at least one of the hydrogen atom may be substituted with a halogen atom. X represents a $C_1$ to $C_6$ linear or branched alkylene group in which at least one of the hydrogen atom may be substituted with a halogen atom, or a $C_2$ to $C_6$ bivalent linking group comprising at least one ether bond.)

(2) The nonaqueous electrolytic solution described in (1), wherein a content of said compound represented by the general formula (I) is 0.001 to 10 mass % in the nonaqueous electrolytic solution.

(3) The nonaqueous electrolytic solution described in (1) or (2), wherein R in said compound represented by the general formula (I) is a $C_1$ to $C_6$ alkyl group or a $C_2$ to $C_6$ alkenyl group in which at least one of the hydrogen atom may be substituted with a halogen atom.

(4) The nonaqueous electrolytic solution described in any one of (1) to (3), wherein X in said compound represented by the general formula (I) is a $C_1$ to $C_6$ linear or branched alkylene group in which at least one of the hydrogen atom may be substituted with a halogen atom.

(5) The nonaqueous electrolytic solution described in (3) or (4), wherein R in said compound represented by the general formula (I) is a $C_2$ to $C_6$ alkenyl group, and X is a $C_1$ to $C_6$ linear alkylene group.

(6) The nonaqueous electrolytic solution described in (1), wherein said compound represented by the general formula (I) is one kind or at least two kinds selected from 2-isocyanatoethyl acrylate, 2-isocyanatoethyl methacrylate, 2-isocyanatoethyl crotonate, 2-(2-isocyanatoethoxy)ethyl acrylate, 2-(2-isocyanatoethoxy)ethyl methacrylate, 2-(2-isocyanatoethoxy)ethyl crotonate and bis(2-isocyanatoethyl)carbonate.

(7) The nonaqueous electrolytic solution described in any one of (1) to (3), wherein said nonaqueous solvent contains cyclic carbonate and chain ester.

(8) The nonaqueous electrolytic solution described in (7), wherein said cyclic carbonate is at least one kind of any one of cyclic carbonates having an unsaturated bond selected from vinylene carbonate, vinyl ethylene carbonate and 4-ethynyl-1,3-dioxolane-2-one, cyclic carbonates having a fluorine atom selected from 4-fluoro-1,3-dioxolane-2-one and trans- or cis-4,5-difluoro-1,3-dioxolane-2-one, ethylene carbonate, propylene carbonate, 1,2-butylene carbonate, and 2,3-butylene carbonate.

(9) The nonaqueous electrolytic solution described in (7), wherein said cyclic carbonate contains at least one kind of cyclic carbonate having a unsaturated bond that is a carbon-carbon double bond or a carbon-carbon triple bond and at least one kind of cyclic carbonate having a fluorine atom.

(10) The nonaqueous electrolytic solution described in (7), wherein said chain ester is one kind or at least two kinds selected from asymmetrically chain carbonates selected from methylethyl carbonate, methylpropyl carbonate, methylisopropyl carbonate, methylbutyl carbonate and ethylpropyl carbonate, symmetrically chain carbonates selected from dimethyl carbonate, diethyl carbonate, dipropyl carbonate and dibutyl carbonate, and chain carboxylic acid esters.

(11) The nonaqueous electrolytic solution described in any one of (1) to (10), wherein the nonaqueous electrolytic solution further contains at least one kind selected from nitrile compounds and sultone compounds.

(12) The nonaqueous electrolytic solution described in any one of (1) to (11), wherein said electrolytic salt is a lithium salt or onium salt.

(13) The nonaqueous electrolytic solution described in any one of (1) to (12), wherein said electrolytic salt contains one kind or at least two kinds selected from $LiPF_6$, $LiPO_2F_2$, $Li_2PO_3F$, $LiBF_4$, $LiN(SO_2CF_3)_2$, $LiN(SO_2C_2F_5)_2$, $LiN(SO_2F)_2$, lithium difluorobis[oxalate-O,O'] phosphate, and lithium tetrafluoro[oxalate-O,O'] phosphate.

(14) The nonaqueous electrolytic solution described in any one of (1) to (13), wherein a concentration of the electrolytic salt is 0.3 to 2.5 M with respect to the nonaqueous solvent.

(15) An energy storage device comprising a positive electrode, a negative electrode and a nonaqueous electrolytic solution prepared by dissolving an electrolyte salt in a nonaqueous solvent, wherein the nonaqueous electrolytic solution is the nonaqueous electrolytic solution described in any one of (1) to (14).

(16) The energy storage device described in (15), wherein said positive electrode contains at least one kind selected from lithium complex metal oxides and lithium-containing olivine-type phosphoric acid salts as a positive electrode active material.

(17) The energy storage device described in (15) or (16), wherein said negative electrode contains at least one kind selected from lithium metal, lithium alloy, carbon materials which can absorb and release lithium, and metal compounds which can absorb and release lithium as an negative electrode active material.

Effects of the Invention

According to the present invention, it is possible to provide a nonaqueous electrolytic solution that can improve the electrochemical properties in a broad temperature range, particularly the cycle property at low temperature and the discharge property at low temperature after storage at high temperature, and an energy storage device such as a lithium cell using the same.

DESCRIPTION OF EMBODIMENTS

The present invention relates to a nonaqueous electrolytic solution and an energy storage device using the same.
[Nonaqueous Electrolytic Solution]
The nonaqueous electrolytic solution of the present invention is a nonaqueous electrolytic solution in which an electrolytic salt is dissolved in a nonaqueous solvent, and which contains at least one kind of isocyanate having an ester structure (R—C(=O)—O—) represented by said general formula (I) in the nonaqueous electrolytic solution.

The reasons that the nonaqueous electrolytic solution of the present invention can drastically improve the electrochemical properties in a broad temperature range are not necessarily clear, but the followings are considered. In the compound represented by said general formula (I) of the present invention, the isocyanate group (—N=C=O) and the ester structure (R—C(=O)—O—) are bonded through a bivalent linking group comprising an alkylene group or ether bond. The isocyanate group has high electrophilicity, and is easily decomposed reductively, and thus reductively decomposed on the surface of the negative electorde at the time of the first charge, and forms a coating film having high resistance. On the other hand, the compound represented by said general formula (I) of the present invention has the ester structure having low electrophilicity in addition to the isocyanate group, and the isocyanate group is bonded to the ester structure having low electrophilicity through a bivalent linking group comprising an alkylene group or ether bond, which leads to alleviation in the speed of the reductive decomposition, and gentle reaction on the surface of the negative. Accordingly, it is understood that by using the nonaqueous electrolytic solution of the present invention, a coating film is formed having high heat resistance and low resistance on the surface of the negative electrode without too much refinement, and specific effects of prominently improving the electrochemical properties in a broad temperature range from low temperature to high temperature are caused.

The isocyanate compound having the ester structure contained in the nonaqueous electrolytic solution of the present invention is represented by the general formula (I) described below.

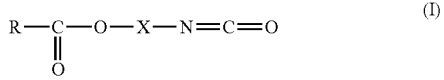
(I)

(wherein R represents a $C_1$ to $C_6$ alkyl group, a $C_2$ to $C_6$ alkenyl group, a $C_6$ to $C_{12}$ aryl group, a $C_1$ to $C_6$ alkyloxy group, a $C_2$ to $C_6$ alkenyloxy group, a $C_2$ to $C_6$ isocyanatoalkyloxy group, or a $C_6$ to $C_{12}$ aryloxy group in which at least one of the hydrogen atom may be substituted with a halogen atom. X represents a $C_1$ to $C_6$ linear or branched alkylene group in which at least one of the hydrogen atom may be substituted with a halogen atom, or a $C_2$ to $C_6$ bivalent linking group comprising at least one ether bond.)

R in said general formula (I) is more preferably a $C_1$ to $C_6$ alkyl group, a $C_2$ to $C_6$ alkenyl group or a $C_6$ to $C_{12}$ aryl group, and further preferably a $C_1$ to $C_6$ alkyl group or a $C_2$ to $C_6$ alkenyl group.

As specific examples of said R, alkyl groups such as a methyl group, an ethyl group, an n-propyl group, an n-butyl group, an n-pentyl group, an n-hexyl group, an iso-propyl group, a sec-butyl group and a tert-butyl group, alkenyl groups such as a vinyl group, an allyl group, a 1-propen-1-yl group, a 2-buten-1-yl group, a 3-buten-1-yl group, a 4-penten-1-yl group, a 5-hexen-1-yl group, a 1-propen-2-yl group and a 3-methyl-2-buten-1-yl group, alkyloxy groups such as a methoxy group, an ethoxy group and a propoxy group, alkenyloxy groups such as a vinyloxy group and an allyloxy group, isocyanatoalkyl groups such as an isocyanatoethyloxy group, and aryl groups such as a phenyl group, a 2-methylphenyl group, a 3-methylphenyl group, a 4-methylphenyl group, a 4-tert-butylphenyl group, a 2,4,6-trimethylphenyl group, a 2-fluorophenyl group, a 3-fluorophenyl group, a 4-fluorophenyl group, a 2,4-difluorophenyl group, a 2,6-difluorophenyl group, a 3,4-difluorophenyl group, a 2,4,6-tri fluorophenyl group, a pentafluorophenyl group and a 4-trifluoromethylphenyl group may be suitably mentioned. Among them, R is preferably a methyl group, an ethyl group, a vinyl group, a 1-propen-2-yl group or a phenyl group, and further preferably a methyl group, a vinyl group or a 1-propen-2-yl group.

X in said general formula (I) represents a $C_1$ to $C_6$ linear or branched alkylene group in which at least one of the hydrogen atom may be substituted with a halogen atom, or a $C_2$ to $C_6$ bivalent linking group comprising at least one ether bond, and is more preferably an alkylene group.

As specific examples of said X, alkylene groups such as a methylene group, an ethane-1,2-diyl group, an ethane-1,1-diyl group, a propane-1,3-diyl group, a propane-1,2-diyl group, a propane-1,1-diyl group, a butane-1,4-diyl group, a butane-1,3-diyl group, a 2-methyl propane-1,2-diyl group, a pentane-1,5-diyl group and a hexane-1,6-diyl group, halogenated alkylene groups such as a monofluoromethylene group, a difluoromethylene group, a 1,2-difluoroethane-1,2-diyl group, a 1,1-difluoroethane-1,2-diyl group, a 1,3-difluoropropane-1,3-diyl group and a 2,2-difluoropropane-1,3-diyl group, and alkylene groups comprising an ether bond such as a 3-oxapentane-1,5-diyl group, a 4-oxaheptane-2,6-diyl group and a 3,6-dioxaoctane-1,8-diyl group may be suitably mentioned. Among them, X is preferably a methylene group, an ethane-1,2-diyl group, an ethane-1,1-diyl group, a propane-1,3-diyl group, a propane-1,2-diyl group, a propane-1,1-diyl group, a butane-1,4-diyl group, a butane-1,3-diyl group, a 2-methyl propane-1,2-diyl group, a monofluoromethylene group, a difluoromethylene group, a 3-oxapentane-1,5-diyl group or a 3,6-dioxaoctane-1,8-diyl group, and further preferably an ethane-1,2-diyl group, a propane-1,3-diyl group or a propane-1,2-diyl group.

As the isocyanate having the ester structure represented by said general formula (I), the following compound may be suitably mentioned specifically.

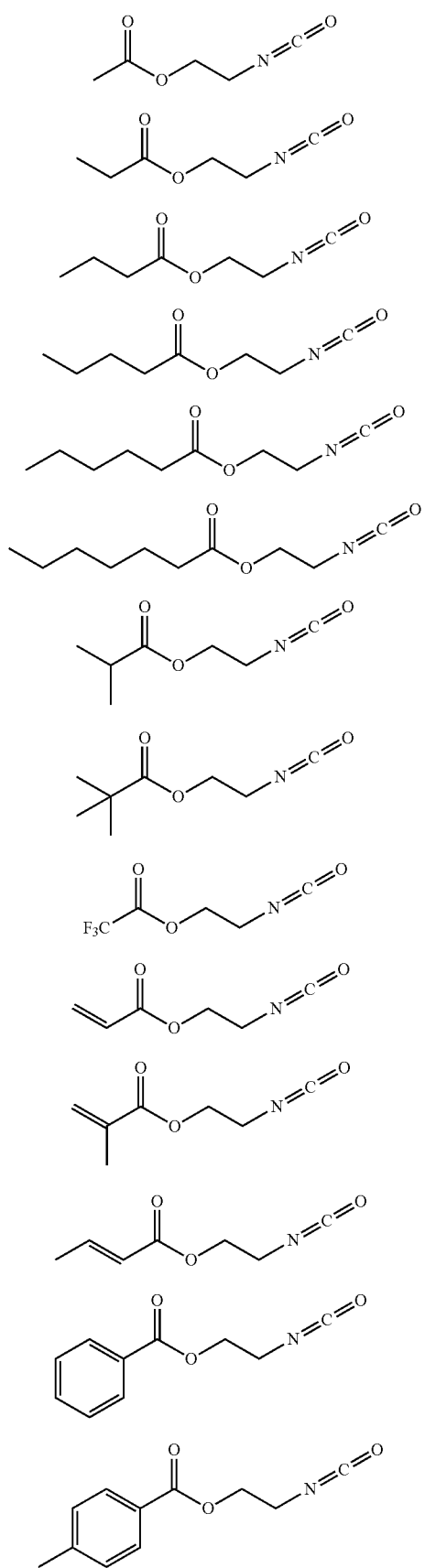
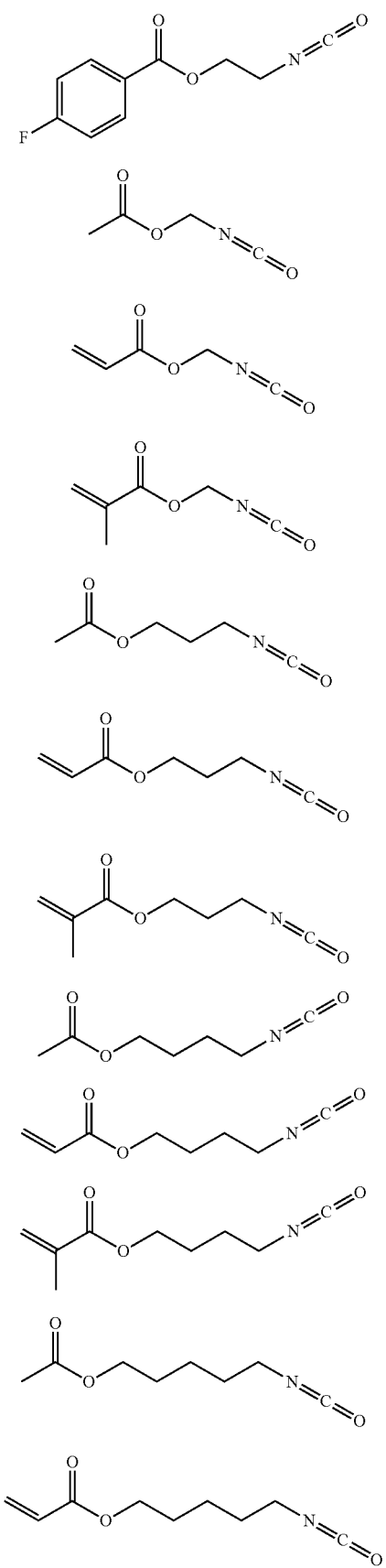

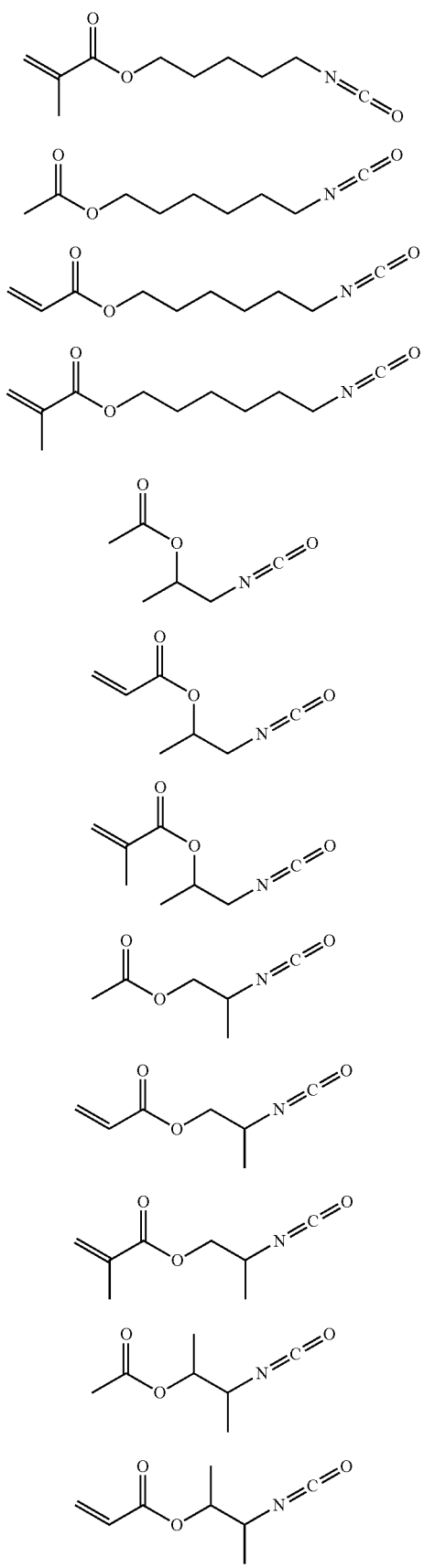
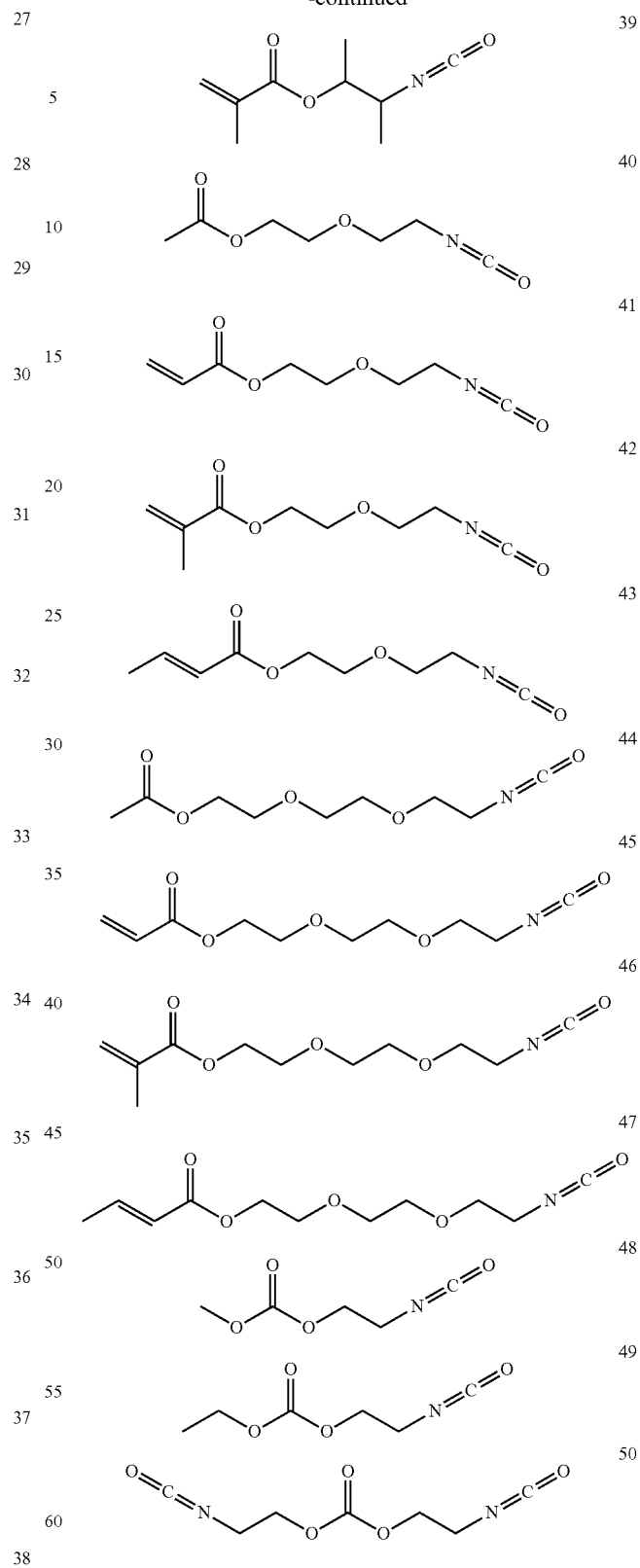
Among the isocyanates having the ester structure represented by said general formula (I), the isocyanate is preferably one kind or at least two kinds selected from the compounds having Structures 1, 10 to 12, 14, 15, 31 to 36, and 40 to 43 described above, and further preferably one kind or at least two kinds selected from 2-isocyanatoethyl acrylate (Structural formula 10), 2-isocyanatoethyl methacrylate (Structural formula 11), 2-isocyanatoethyl crotonate (Structural formula 12), 2-(2-isocyanatoethoxy)ethyl acrylate (Structural formula 41), 2-(2-isocyanatoethoxy)ethyl methacrylate (Structural formula 42), and 2-(2-isocyanatoethoxy)ethyl crotonate (Structural formula 43).

The substituents in the scope described above are preferable since the electrochemical properties in a broad temperature range are further improved.

In the nonaqueous electrolytic solution of the present invention, the content of the isocyanate compound having the ester structure represented by said general formula (I) contained in the nonaqueous electrolytic solution is preferably 0.001 to 10 mass % in the nonaqueous electrolytic solution. If the content is 10 mass or less, the fear of the decline of the properties at low temperature due to too much formation of the coating film on the electrode is small. In addition, if the content is 0.001 mass % or more, formation of the coating film is sufficient, and effects of improving the storage properties at high temperature increase. The content is preferably 0.05 mass % or more, and more preferably 0.2 mass % or more in the nonaqueous electrolytic solution. In addition, the upper limit thereof is preferably 8 mass % or less, more preferably 5 mass % or less, and particularly preferably 2 mass % or less.

Combination of the isocyanate compound having the ester structure represented by said general formula (I) with the nonaqueous solvent, the electrolytic salt, and further the other additives described below allows the nonaqueous electrolytic solution of the present invention to exert synergistically the specific effects of improving the electrochemical properties in a broad temperature range.

[Nonaqueous Solvent]

As the nonaqueous solvent used in the nonaqueous electrolytic solution of the present invention, cyclic carbonate, chain ester, lactone, ether and amide may be mentioned. The nonaqueous solvent preferably contains cyclic carbonate only, or both of cyclic carbonate and chain ester.

Meanwhile, the term chain ester is used as a concept including chain carbonate and chain carboxylic acid ester.

As the cyclic carbonate, one kind or at least two kinds selected from ethylene carbonate (EC), propylene carbonate (PC), 1,2-butylene carbonate, 2,3-butylene carbonate, 4-fluoro-1,3-dioxolane-2-one (FEC), trans- or cis-4,5-difluoro-1,3-dioxolane-2-one (hereinafter, both of them are collectively referred to as "DFEC"), vinylene carbonate (VC), vinyl ethylene carbonate (VEC), and 4-ethynyl-1,3-dioxolane-2-one (EEC) may be mentioned. One kind or at least two kinds selected from ethylene carbonate, propylene carbonate, 4-fluoro-1,3-dioxolane-2-one, vinylene carbonate and 4-ethynyl-1,3-dioxolane-2-one (EEC) are more suitable.

Among them, at least one kind of cyclic carbonate having a unsaturated bond such as a carbon-carbon double bond and a carbon-carbon triple bond, or fluorine atom is preferably used since the load properties at low temperature after storage at high temperature in the charged state further improves, and those containing both of cyclic carbonate having a unsaturated bond such as a carbon-carbon double bond and a carbon-carbon triple bond and cyclic carbonate having a fluorine atom is more preferably used. As the cyclic carbonate having an unsaturated bond such as a carbon-carbon double bond and a carbon-carbon triple bond, VC, VEC or EEC is further preferable, and as the cyclic carbonate having a fluorine atom, FEC or DFEC is further preferable.

The content of the cyclic carbonate having a unsaturated bond such as a carbon-carbon double bond and a carbon-carbon triple bond is preferably 0.07 volume % or more, more preferably 0.2 volume % or more, and further preferably 0.7 volume % or more, and the upper limit is preferably 7 volume % or less, more preferably 4 volume % or less, and further preferably 2.5 volume % or less with respect to the total volume of the nonaqueous solvent since it can further preferably increase the stability of the coating film at the time of high temperature storage without damage to Li ion permeability at low temperature.

The content of the cyclic carbonate having a fluorine atom is preferably 0.07 volume % or more, more preferably 4 volume % or more and further preferably 7 volume % or more, and the upper limit is preferably 35 volume % or less, more preferably 25 volume % or less, and further preferably 15 volume % or less with respect to the total volume of the nonaqueous solvent since it can further preferably increase the stability of the coating film at the time of high temperature storage without damage to Li ion permeability at low temperature.

In addition, the nonaqueous solvent preferably contains ethylene carbonate and/or propylene carbonate since it reduces the resistance of the coating film formed on the electrode. The content of ethylene carbonate and/or propylene carbonate is preferably 3 volume % or more, more preferably 5 volume % or more, and further preferably 7 volume % or more, and the upper limit is preferably 45 volume % or less, more preferably 35 volume % or less, and further preferably 25 volume % or less with respect to the total volume of the nonaqueous solvent.

These solvents may be used in one kind. In addition, these solvents are preferably used in 2 or more kinds and particularly preferably 3 or more kinds in combination since the electrochemical properties in a broad temperature range are further improved. A suitable combination of these cyclic carbonates is preferably EC and PC, EC and VC, PC and VC, VC and FEC, EC and FEC, PC and FEC, FEC and DFEC, EC and DFEC, PC and DFEC, VC and DFEC, VEC and DFEC, VC and EEC, EC and EEC, EC, PC and VC, EC, PC and FEC, EC, VC and FEC, EC, VC and VEC, EC, VC and EEC, EC, EEC and FEC, PC, VC and FEC, EC, VC and DFEC, PC, VC and DFEC, EC, PC, VC and FEC, EC, PC, VC and DFEC, etc. Among said combinations, the more preferably combinations are a combination of EC and VC, EC and FEC, PC and FEC, EC, PC and VC, EC, PC and FEC, EC, VC and FEC, EC, VC and EEC, EC, EEC and FEC, PC, VC and FEC, EC, PC, VC and FEC, etc.

As the chain ester, asymmetrically-chain carbonates such as methylethyl carbonate (MEC), methylpropyl carbonate (MPC), methylisopropyl carbonate (MIPC), methylbutyl carbonate and ethylpropyl carbonate, symmetrically-chain carbonates such as dimethyl carbonate (DMC), diethyl carbonate (DEC), dipropyl carbonate and dibutyl carbonate, pivalic acid esters such as methyl pivalate, ethyl pivalate and propyl pivalate, and chain carboxylic acid esters such as methyl propionate, ethyl propionate, methyl acetate and ethyl acetate may be suitably mentioned.

The content of the chain ester is not particularly limited, but is preferably used in a range of 60 to 90 volume % with respect to the total volume of the nonaqueous solvent. The above-mentioned range is preferable since the effects of decreasing the viscosity of the nonaqueous electrolytic solution is sufficiently obtained if the content is 60 volume % or more. If the content is 90 volume % or less, the electrical conductivity of the nonaqueous electrolytic solution sufficiently increases, and the electrochemical properties in a broad temperature range improve.

Among said chain esters, a chain ester having a methyl group selected from dimethyl carbonate, methylethyl carbonate, methylpropyl carbonate, methylisopropyl carbonate, methylbutyl carbonate, methyl propionate, methyl acetate and ethyl acetate is preferable, and a chain carbonate having a methyl group is particularly preferable.

In addition, when the chain carbonate is used, it is preferably used in at least two kinds. Furthermore, both of the symmetrically chain carbonate and the asymmetrically chain carbonate are contained more preferably, and it is further preferable that the content of the symmetrically chain carbonate is greater than that of the asymmetrically chain carbonate.

The volume ratio taken up by the symmetrically chain carbonate in the chain carbonate is preferably 51 volume % or more, and is more preferably 55 volume % or more. The upper limit is more preferably 95 volume % or less, and further preferably 85 volume % or less. The symmetrically chain carbonate particularly preferably contains dimethyl carbonate. In addition, the asymmetrically chain carbonate is more preferably those having a methyl group, and particularly preferably methylethyl carbonate.

The above-mentioned case is preferable since the electrochemical properties improve in a further broader temperature range.

The ratio of the cyclic carbonate and the chain ester is, as cyclic carbonate:chain ester (volume ratio), preferably 10:90 to 70:30, more preferably 15:85 to 50:50, and particularly preferably 20:80 to 35:65 from the viewpoint of improvement of the electrochemical properties in a broad temperature range.

As the other nonaqueous solvent, cyclic ethers such as tetrahydrofuran, 2-methyl tetrahydrofuran, 1,3-dioxolane, 1,3-dioxane and 1,4-dioxane, chain ethers such as 1,2-dimethoxy ethane, 1,2-diethoxy ethane and 1,2-dibutoxyethane, amides such as dimethyl formamide, sulfones such as sulfolane, lactones such as γ-butyrolactone, γ-valerolactone and α-angelica lactone, etc. may be suitably mentioned.

The above-mentioned nonaqueous solvent is ordinarily used in a mixture in order to accomplish appropriate physical properties. As the combination thereof, for example, a combination of the cyclic carbonate and the chain carbonate, a combination of the cyclic carbonate and the chain carboxylic acid ester, a combination of the cyclic carbonate, the chain carbonate and the lactone, a combination of the cyclic carbonate, the chain carbonate and the ether, and a combination of the cyclic carbonate, the chain carbonate and the chain carboxylic acid ester, etc. may be suitably mentioned.

For the purpose of improving the electrochemical properties in a further broader temperature range, other additives are preferably further added to the nonaqueous electrolytic solution.

As specific examples of the other additives, phosphoric acid esters such as trimethyl phosphate, tributyl phosphate and trioctyl phosphate, nitriles such as acetonitrile, propionitrile, succinonitrile, glutaronitrile, adiponitrile, and pimelonitrile, isocyanates other than the isocyanate compound having the ester structure represented by said general formula (I) such as tetramethylene diisocyanate, hexamethylene diisocyanate and octamethylene diisocyanate, sultone compounds such as 1,3-propanesultone, 1,3-butanesultone, 2,4-butanesultone and 1,4-butanesultone, cyclic sulfites such as ethylene sulfite, hexahydrobenzo[1,3,2]dioxathiolane-2-oxide (also referred to as 1,2-cyclohexanediol cyclic sulfite) and 5-vinyl-hexahydro-1,3,2-benzodioxathiol-2-oxide, sulfonic acid esters such as 2-propynyl methane sulfonate, butane-1,4-diyl dimethane sulfonate, 2-butyne-1,4-diyl dimethane sulfonate, pentane-1,5-diyl dimethane sulfonate, propane-1,2-diyl dimethane sulfonate, butane-2,3-diyl dimethane sulfonate, methylene methane disulfonate, 2-trifluoromethylphenyl methane sulfonate, pentafluorophenyl methane sulfonate and methylene methane disulfonate, S=O bond-containing compounds selected from vinyl sulfones such as divinyl sulfone, 1,2-bis(vinyl sulfonyl) ethane and bis(2-vinyl sulfonylethyl) ether etc., chain carboxylic acid anhydrides such as acetic anhydride and propionic anhydride, cyclic acid anhydrides such as succinic anhydride, maleic anhydride, glutaric anhydride, itaconic anhydride and 3-sulfo-propionic anhydride, cyclic phosphazene compounds such as methoxypentafluorocyclotriphosphazene, ethoxypentafluorocyclotriphosphazene, phenoxypentafluorocyclotriphosphazene and ethoxyheptafluorocyclotetraphosphazene, aromatic compounds having a branched alkyl group such as cyclohexyl benzene, fluorocyclohexyl benzene compounds (1-fluoro-2-cyclohexyl benzene, 1-fluoro-3-cyclohexyl benzene and 1-fluoro-4-cyclohexyl benzene), tert-butyl benzene, tert-amyl benzene and 1-fluoro-4-tert-butyl benzene; and aromatic compounds such as biphenyl, terphenyl (o-, m- and p-forms), diphenyl ether, fluorobenzene, difluorobenzene (o-, m- and p-forms), anisole, 2,4-difluoroanisole, a partial hydride of terphenyl (1,2-dicyclohexyl benzene, 2-phenyl bicyclohexyl, 1,2-diphenyl cyclohexane and o-cyclohexyl biphenyl) may be suitably mentioned.

Among those mentioned above, the nitrile and/or the aromatic compound is preferably contained since the electrochemical properties improve in a further broader temperature range. Among the nitriles, succinonitrile, glutaronitrile, adiponitrile or pimelonitrile is more preferable. In addition, among the aromatic compounds, biphenyl, cyclohexyl benzene, tert-butyl benzene or tert-amyl benzene is more preferable. The content of the nitrile and/or aromatic compound is preferably 0.001 to 5 mass % in the nonaqueous electrolytic solution. In this range, the coating film is sufficiently formed without being too thick, and the effects of improving the electrochemical properties in a broad temperature range increase. The content is more preferably 0.005 mass % or more, further preferably 0.01 mass % or more, and particularly preferably 0.03 mass % or more, and the upper limit thereof is preferably 3 mass % or less more, further preferably 1 mass % or less, and particularly preferably 0.4 mass % or less in the nonaqueous electrolytic solution.

In addition, the cyclic or chain S=O group-containing compound selected from the sultone compounds, the cyclic sulfites, the sulfonate esters and the vinyl sulfones is preferably contained since the electrochemical properties improve in a further broader temperature range. Among the cyclic S=O group-containing compounds, 1,3-propanesultone, 1,3-butanesultone, 2,4-butanesultone, 1,4-butanesultone, ethylene sulfite, or 4-(methyl sulfonylmethyl)-1,3,2-dioxathiolane-2-oxide is preferable, and 1,3-propanesultone or 1,4-butanesultone is further preferable. Among the chain S=O group-containing compounds, 2-propynyl methane sulfonate, butane-2,3-diyl dimethane sulfonate, butane-1,4-diyl dimethane sulfonate, 2-butyne-1,4-diyl dimethane sulfonate, methylene methane disulfonate, divinyl sulfone or bis(2-vinyl sulfonylethyl)ether is preferable, at least one kind of the sulfonic acid ester selected from 1,3-propanesultone, 2,4-butanesultone, 1,4-butanesultone, 2-propynyl methane sulfonate, butane-2,3-diyl dimethane sulfonate and 2-butyne-1,4-diyl dimethane sulfonate is further preferable, and at least one kind of the cyclic or chain sulfonate esters selected from 1,3-propanesultone, 2,4-butanesultone, 2-propynyl methane sulfonate, 2-butyne-1,4-diyl dimethane sulfonate and butane-2,3-diyl dimethane sulfonate is particularly preferable. The content of the S=O group-containing compound is preferably 0.001 to 5 mass % in the nonaqueous electrolytic solution. In this range, the coating film is sufficiently formed without being too thick and the effects of improving the electrochemical properties in a broad temperature range increase. The content is more preferably 0.005 mass % or more, further preferably 0.01 mass % or more, and particularly preferably 0.03 mass % or more, and the upper limit thereof is more preferably 3 mass % or less, further preferably 1 mass % or less, and particularly preferably 0.4 mass % or less in the nonaqueous electrolytic solution.

[Electrolytic Salt]

As the electrolytic salt used in the present invention, the lithium salts and the onium salts described below may be suitably mentioned.

(Lithium salt)

As the lithium salt, inorganic lithium salts such as $LiPF_6$, $LiPO_2F_2$, $Li_2PO_3F$, $LiBF_4$ and $LiClO_4$, lithium salts containing a chain fluoroalkyl group such as $LiN(SO_2CF_3)_2$, $LiN(SO_2C_2F_5)_2$, $LiCF_3SO_3$, $LiC(SO_2CF_3)_3$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_7)$ lithium salts containing a cyclic fluoroalkylene chain such as $(CF_2)_2(SO_2)_2NLi$ and $(CF_2)_3(SO_2)_2NLi$, and lithium salts having an oxalate complex as an anion such as lithium bis[oxalate-O,O'] borate, lithium difluoro[oxalate-O,O'] borate, lithium difluorobis[oxalate-O,O'] phosphate and lithium tetrafluoro[oxalate-O,O'] phosphate may be suitably mentioned. They may be used in one kind or in a mixture of at least two kinds. Among them, at least one kind selected from $LiPF_6$, $LiPO_2F_2$, $Li_2PO_3F$, $LiBF_4$, $LiN(SO_2CF_3)_2$, $LiN(SO_2C_2F_5)_2$, lithium bis[oxalate-O,O'] borate, lithium difluoro[oxalate-O,O'] borate, and lithium difluorobis[oxalate-O,O'] phosphate is preferable, and at least one kind selected from $LiPF_6$, $LiPO_2F_2$, $LiBF_4$, $LiN(SO_2CF_3)_2$, lithium bis[oxalate-O,O'] borate, and lithium difluorobis[oxalate-O,O'] phosphate is further preferable. The concentration of the lithium salt is ordinarily, preferably 0.3 M or more, more preferably 0.7 M or more, and further preferably 1.1 M or more with respect to said nonaqueous solvent. In addition, the upper limit thereof is preferably 2.5 M or less, more preferably 2.0 M or less, and further preferably 1.6 M or less.

In addition, as a suitable combination of these lithium salts, one contained $LiPF_6$ is preferable, and one further contained at least one kind of lithium salt selected from $LiPO_2F_2$, $LiBF_4$ and $LiN(SO_2CF_3)_2$ in the nonaqueous electrolytic solution is further preferable. The ratio of the lithium salts other than $LiPF_6$ taken up in the nonaqueous solvent is preferably 0.001M or more since effects of improving the electrochemical properties in a broad temperature range are easily exerted, and the ratio is preferably 0.5 M or less since the fear of the decline of the effects of improving the electrochemical properties in a broad temperature range is small. The ratio is preferably 0.01 M or more, particularly preferably 0.03 M or more, and most preferably 0.04 M or more. The upper limit thereof is preferably 0.4 M or less, and particularly preferably 0.2 M or less.

(Onium Salt)

Also, as the onium salt, various salts from combination of the onium cation and the anion described below may be suitably mentioned.

As specific examples of the onium cation, tetramethyl ammonium cation, ethyltrimethyl ammonium cation, diethyldimethyl ammonium cation, triethylmethyl ammonium cation, tetraethyl ammonium cation, N,N-dimethyl pyrrolidinium cation, N-ethyl-N-methyl pyrrolidinium cation, N,N-diethyl pyrrolidinium cation, spiro-(N,N')-bipyrrolidinium cation, N,N'-dimethyl imidazolinium cation, N-ethyl-N'-methyl imidazolinium cation, N,N'-diethyl imidazolinium cation, N,N'-dimethyl imidazolinium cation, N-ethyl-N'-methyl imidazolinium cation, N,N'-diethyl imidazolinium cation, etc. may be suitably mentioned.

As specific examples of the anion, $PF_6$ anion, $BF_4$ anion, $ClO_4$ anion, $AsF_6$ anion, $CF_3SO_3$ anion, $N(CF_3SO_2)_2$ anion, $N(C_2F_5SO_2)_2$ anion, etc. may be suitably mentioned.

These electrolyte salts may be used alone in one kind or may be used in combination of two or more kinds.

[Preparation of the Nonaqueous Electrolytic Solution]

The nonaqueous electrolytic solution of the present invention may be obtained by, for example, mixing the above nonaqueous solvents, and adding to this the compound represented by the general formula (I), with respect to the electrolyte salts and the nonaqueous electrolytic solution.

At this time, as the compound added to the nonaqueous solvent and the nonaqueous electrolytic solution that is used, the compound having small impurities as possible by being purified in advance is preferably used within a range where the productivity does not prominently decline.

The nonaqueous electrolytic solution of the present invention may be used in the first to the fourth energy storage devices described below. As the nonaqueous electrolyte, not only liquid one, but also gellated one may be used. Furthermore, the nonaqueous electrolytic solution of the present invention may be also used for a solid polymer electrolyte. Among these, the nonaqueous electrolytic solution of the present invention is preferably used for the first energy storage device (namely, for a lithium battery) or for the fourth energy storage device (namely, for a lithium ion capacitor) in which a lithium salt is used as the electrolyte salts, and more preferably used for a lithium battery, and most suitably used for the lithium secondary battery.

[First Energy Storage Device (Lithium Battery)]

The lithium battery of the present invention is a general term for a lithium primary battery and a lithium secondary battery. Further, in the present description, the term of the lithium secondary battery is used as a concept also including the so-called lithium ion secondary battery. The lithium battery of the present invention comprises a positive electrode, a negative electrode and the nonaqueous electrolytic solution in which an electrolyte salt is dissolved in a nonaqueous solvent. The constituent members such as the positive electrode and the negative electrode etc. besides the nonaqueous electrolytic solution may be used without particular limitation.

For example, as the positive electrode active material for a lithium secondary battery, a complex metal oxide with lithium, which contains one or more kinds selected from cobalt, manganese and nickel, is used. These positive electrode active materials may be used alone in one kind or in combination of two or more kinds.

As the lithium complex metal oxide, for example, $LiCoO_2$, $LiMn_2O_4$, $LiNiO_2$, $LiCo_{1-x}Ni_xO_2$ (0.01<x<1), $LiCo_{1/3}Ni_{1/3}Mn_{1/3}O_2$, $LiNi_{1/2}Mn_{3/2}O_4$, $LiCo_{0.98}Mg_{0.02}O_2$, etc. may be mentioned. Further, it may be used in combination such as $LiCoO_2$ and $LiMn_2O_4$, $LiCoO_2$ and $LiNiO_2$, $LiMn_2O_4$ and $LiNiO_2$.

In addition, a portion of the lithium complex metal oxide may be substituted with another element in order to improve the safety at the time of the overcharge, or the cycle property, and allow the usage at 4.3 V or more of the charge potential based on Li. For example, a portion of cobalt, manganese or nickel may be substituted with at least one or more kinds of elements such as Sn, Mg, Fe, Ti, Al, Zr, Cr, V, Ga, Zn, Cu, Bi, Mo and La, or a portion of O may be substituted with S or F, or the lithium complex metal oxide may be coated with a compound that contains these other elements.

Among these, a lithium complex metal oxide that allows the usage at 4.3 V or more of the charge potential of the positive electrode based on Li in the full-charge state, such as $LiCoO_2$, $LiMn_2O_4$ and $LiNiO_2$, is preferable, a lithium complex metal oxide that allows the usage at 4.4 V or more based on Li such as a solid solution with $LiCo_{1-x}M_xO_2$ (wherein, M is at least one or more kinds of elements selected from Sn, Mg, Fe, Ti, Al, Zr, Cr, V, Ga, Zn and Cu, $0.001 \leq x \leq 0.05$), $LiCo_{1/3}Ni_{1/3}Mn_{1/3}O_2$, $LiNi_{1/2}Mn_{3/2}O_4$, and $Li_2MnO_3$ and $LiMO_2$ (M is a transitional metal such as Co, Ni, Mn and Fe) is more preferable. When a lithium complex metal oxide operating at high charge voltage is used, particularly the electrochemical properties in a broad temperature range easily decline due to the reaction with an electrolytic solution at the time of the charge. However, the lithium secondary battery related to the present invention can suppress the decline of these electrochemical properties.

Particularly, when a positive electrode containing Mn is used, the resistance of a battery tends to easily increase due to elution of Mn ion from the positive electrode, and thus the electrochemical properties in a broad temperature range tend to easily decline. However, the lithium secondary battery related to the present invention can suppress the decline of these electrochemical properties, and thus is preferable.

Furthermore, as the positive electrode active material, lithium-containing olivine-type phosphoric acid salt may be also used. Particularly, lithium-containing olivine-type phosphoric acid salt containing at least one or more kinds selected from iron, cobalt, nickel and manganese is preferable. As specific examples thereof, $LiFePO_4$, $LiCoPO_4$, $LiNiPO_4$, $LiMnPO_4$, etc. may be mentioned.

A portion of these lithium-containing olivine-type phosphoric acid salts may be substituted with another element. A portion of iron, cobalt, nickel or manganese may be substituted with one or more kinds of an element selected from Co, Mn, Ni, Mg, Al, B, Ti, V, Nb, Cu, Zn, Mo, Ca, Sr, W and Zr, etc. or the lithium-containing olivine-type phosphoric acid salt may be coated with a compound containing these other elements or a carbon material. Among these, $LiFePO_4$ or $LiMnPO_4$ is preferable.

Further, the lithium-containing olivine-type phosphoric acid salt may be used in a mixture with, for example, the above positive electrode active material.

In addition, As the positive electrode for a lithium primary battery, one kind, or two or more kinds of metal elements or chalcogen compounds such as CuO, $Cu_2O$, $Ag_2O$, $Ag_2CrO_4$, CuS, $CuSO_4$, $TiO_2$, $TiS_2$, $SiO_2$, SnO, $V_2O_5$, $V_6O_{12}$, $VO_x$, $Nb_2O_5$, $Bi_2O_3$, $Bi_2Pb_2O_5$, $Sb_2O_3$, $CrO_3$, $Cr_2O_3$, $MoO_3$, $WO_3$, $SeO_2$, $MnO_2$, $Mn_2O_3$, $Fe_2O_3$, FeO, $Fe_3O_4$, $Ni_2O_3$, NiO, $CoO_3$ and CoO, sulfur compounds such as $SO_2$ and $SOCl_2$, fluorocarbon (fluorographite) represented by general formula $(CF_x)_n$, etc. may be mentioned. Among these, $MnO_2$, $V_2O_5$, fluorographite etc. are preferable.

The conductive material of the positive electrode is not particularly limited as long as an electron conduction material that does not cause chemical change. For example, graphites such as natural graphite (flattened graphite etc.) and artificial graphite, carbon black such as acetylene black, Ketjen black, channel black, furnace black, lamp black and thermal black, etc. may be mentioned. In addition, the graphite and the carbon black may be suitably mixed and used. The addition amount of the conductive material to the positive electrode mixture is preferably 1 to 10 mass %, and particularly preferably 2 to 5 mass %.

The positive electrode can be manufactured by mixing the above-mentioned positive electrode active material with the conductive material such as acetylene black and carbon black, and a binder such as polytetrafluoroethylene (PTFE), polyvinylidene fluoride (PVDF), a copolymer of styrene and butadiene (SBR), a copolymer of acrylonitrile and butadiene (NBR), carboxymethyl cellulose (CMC), and ethylene-propylene-diene terpolymer, and adding a high boiling-point solvent such as 1-methyl-2-pyrrolidone to this, and kneading them to prepare the positive electrode mixture, and then applying this positive electrode mixture to a current collector such as aluminum foil and lath plate made of stainless-steel, drying, pressure molding, and then subjecting the resultant to heat treatment at a temperature of 50° C. to 250° C. or so for 2 hours or so under vacuum.

The density of parts excluding the current collector of the positive electrode is ordinarily 1.5 $g/cm^3$ or more, preferably 2 $g/cm^3$ or more, more preferably 3 $g/cm^3$ or more, and further preferably 3.6 $g/cm^3$ or more in order to further enhance the capacity of the battery. Meanwhile, the upper limit is preferably 4 $g/cm^3$ or less.

As the negative electrode active material for a lithium secondary battery, lithium metal or lithium alloy, and a carbon material which can Absorb and release lithium [graphitizable carbon, non-graphitizable carbon having 0.37 nm or more of the spacing of the (002) plane, graphite having 0.34 nm or less of the spacing of the (002) plane, etc.], tin (simple substance), a tin compound, silicon (simple substance), a silicon compound, and a lithium titanate compound such as $Li_4Ti_5O_{12}$ etc. may be used alone in one kind or in combination of two or more kinds.

Among these, a high crystalline carbon material such as artificial graphite and natural graphite is preferable, and a carbon material having a graphite-type crystalline structure having 0.340 nm (nanometer) or less, particularly 0.335 to 0.337 nm of the spacing ($d_{002}$) of the lattice plane (002) is particularly preferable from the view of absorption and release Ability of the lithium ion.

A ratio (I (110)/I (004)) of a peak intensity I (110) of a (110) plane and a peak intensity I (004) of a (004) plane in the graphite crystal which are obtained from X ray diffractiometry of the negative electrode sheet subjected to pressure molding so that a density of parts excluding the current collector of the negative electrode is 1.5 $g/cm^3$ or more is controlled to 0.01 or more by using artificial graphite particles having a bulky structure in which plural flattened graphite fine particles are put together or combined non-parallel to each other, or graphite particles obtained by exerting repeatedly a mechanical action, such as a compressive force, a friction force, a shearing force, etc. on flaky natural graphite particles to subject them to spheroidizing treatment, whereby the electrochemical characteristics in a further broader temperature range are improved, and therefore it is preferred. The ratio is more preferably 0.05 or more, further preferably 0.1 or more. Further, the negative electrode sheet is treated too much in a certain case and reduced in a crystallinity to reduce a discharge capacity of the battery, and therefore an upper limit thereof is preferably 0.5 or less, more preferably 0.3 or less.

Further, the high crystalline carbon material (core material) is preferably coated with a carbon material having lower crystallinity than that of the core material since the electrochemical properties in a broad temperature range becomes further better. The crystallinity of the coated carbon material can be confirmed by TEM.

When a high crystalline carbon material is used, the high crystalline carbon material reacts with a nonaqueous electrolytic solution at the time of the charge, and the electrochemical properties at high temperature or low temperature tends to decline due to increase of the interface resistance. However, with the lithium secondary battery related to the present invention, the electrochemical properties in a broad temperature range becomes better.

Further, as the metal compound which can absorb and release lithium as the negative electrode active material, compounds containing at least one kind of a metal element such as Si, Ge, Sn, Pb, P, Sb, Bi, Al, Ga, In, Ti, Mn, Fe, Co, Ni, Cu, Zn, Ag, Mg, Sr and Ba may be mentioned. These metal compounds may be used in any form such as an element, an alloy, an oxide, a nitride, a sulfide, a boride, an alloy with lithium. However, the metal compound is preferably any one of an element, an alloy, an oxide and an alloy with lithium since it allows the battery to have high capacity. Among these, those containing at least one kind of an element selected from Si, Ge and Sn are preferable, those containing at least one kind of an element selected from Si and Sn are more preferable since it allows the battery to have high capacity.

The negative electrode can be manufactured in a similar manner to the manufacture of the above-mentioned positive electrode by using and kneading the conductive material, the bindert and the high boiling point solvent to prepare a negative electrode mixture, and then applying this negative electrode mixture to a current collector such as copper foil, drying, pressure molding, and then subjecting the resultant to heat treatment at a temperature of 50° C. to 250° C. or so for 2 hours or so under vacuum.

The density of parts excluding the current collector of the negative electrode is ordinarily 1.1 g/cm$^3$ or more, preferably 1.5 g/cm$^3$ or more, and particularly preferably 1.7 g/cm$^3$ or more in order to further enhance the battery capacity. Meanwhile, the upper limit is preferably 2 g/cm$^3$ or less.

Further, as the negative electrode active material for the lithium primary battery, lithium metal or lithium alloy may be mentioned.

The structure of the lithium battery is not particularly limited, and a coin-type battery, a cylinder-type battery, an square-shaped battery, a laminate-type battery etc. having a unilamellar or laminated separator may be applied.

The separator for the battery is not particularly limited, but a unilamellar or laminated microporous film of a polyolefin such as polypropylene and polyethylene, woven fabric cloth, nonwoven fabric cloth, etc. may be used.

The lithium secondary battery of the present invention is excellent in the electrochemical properties in a broad temperature range even when the charge termination voltage is 4.2 V or more, particularly 4.3 V or more, and further the properties are good even when the charge termination voltage is 4.4 V or more. The discharge cut-off voltage is ordinarily 2.8 V or more, and further can be rendered to be 2.5 V or more. However, the discharge cut-off voltage can be rendered to be 2.0 V or more with the lithium secondary battery of the present invention. The current value is not particularly limited, but is ordinarily used in a range of 0.1 to 30 C. Further, the lithium battery of the present invention can be charged and discharged at −40 to 100° C., preferably −10 to 80° C.

In the present invention, as a countermeasure for increase of the inner pressure of the lithium battery, a method of establishing a safety valve at the cover of the battery, or a method of making incision on a member such as the battery can or the gasket may be also adopted. Further, as a countermeasure for the safety to prevent the overcharge, current shutoff mechanism that shutoffs the current upon perception of the inner pressure of the battery may be established on the cover of the battery.

[Second Energy Storage Device (Electric Double Layer Capacitor)]

The second energy storage device of the present invention is an energy storage device that stores the energy using the capacity of the electric double layer at the interface of the electrolytic solution and the electrode. One example of the present invention is an electric double layer capacitor. The most typical electrode active material used in this energy storage device is activated carbon. The capacity of the double layer increases generally in proportion to the surface area.

[Third Energy Storage Device]

The third energy storage device of the present invention is an energy storage device that stores the energy using the doping/de-doping reaction of the electrode. As the electrode active material used in this energy storage device, metal oxides such as ruthenium oxide, iridium oxide, tungsten oxide, molybdenum oxide and copper oxide, and n conjugated polymers such as polyacene and a polythiophene derivative may be mentioned. A capacitor using these electrode active materials allows storage of the energy accompanied with the doping/de-doping reaction of the electrode.

[Fourth Energy Storage Device (Lithium Ion Capacitor)]

The fourth energy storage device of the present invention is an energy storage device that stores the energy using intercalation of lithium ion into a carbon material such as graphite that is the negative electrode. The energy storage device is called the lithium ion capacitor (LIC). As the positive electrode, for example, those using an electric double layer between the activated carbon electrode and the electrolytic solution, those using the doping/de-doping reaction of n conjugated polymer electrode, etc. may be mentioned In the electrolytic solution, at least lithium salt such as $LiPF_6$ is contained.

EXAMPLES

Hereinafter, Examples of the electrolytic solution of the present invention will be described. However, the present invention is not limited to these Examples.

Examples 1 to 10 and Comparative Examples 1 and 4 [Manufacture of Lithium Ion Secondary Cell]

94 Mass % of $LiCcoO_2$ and 3 mass % of acethylene black (conductive material) were mixed, and added to a solution in which 3 mass % of polyvinylidene fluoride (binder) was dissolved in 1-methyl-2-pyrrolidone in advance, and mixed, to prepare a paste of the positive electrode mixture. This paste of the positive electrode mixture was applied onto one surface of an aluminum foil (current collector), dried, pressure treated and punched to a desired size, to manufacture a positive electrode sheet. The density of the portion excluding the current collector of the positive electrode was 3.6 g/cm$^3$. In addition, 95 mass % of artificial graphite (negative electrode active material, $d_{002}$=0.335 nm) was added to a solution in which 5 mass % of polyvinylidene fluoride (binder) was dissolved in 1-methyl-2-pyrrolidone in advance, and mixed, to prepare a paste of the negative electrode mixture. This paste of the negative electrode mixture was applied onto one surface of a copper foil (current collector), dried, pressure treated and punched to a desired size, to manufacture a negative electrode sheet. The density of the portion excluding the current collector of the negative electrode was 1.5 g/cm$^3$. In addition, X ray diffraction was measured using this electrode sheet. As a result, the ratio [I(110)/I(004)] of the peak intensity I(110) of the graphite crystalline (110) plane and the peak intensity I(004) of the graphite crystalline (004) plane was 0.1. Then, the positive electrode sheet, a separator made of a microporous polyethylene film, and the negative electrode sheet were laminated in this order, and the nonaqueous electrolytic solution of the composition described in Tables 1 to 3 was added, to manufacture a 2032-type coin-type cell.

[Evaluation of Properties at Low Temperature after Charge and Storage at High Temperature]

<Initial Discharge Capacity>

Using the coin-type cell manufactured with the above-mentioned method, in 25° C. constant-temperature bath, the coin-type cell was charged to 4.2 V of the charge termination voltage at 1 C constant current and constant voltage for 3 hours, and then discharged to 2.75 V of the cut-off voltage under 1 C constant current in the constant-temperature bath cooled to 0° C. of the temperature, to obtain the initial 0° C. discharge capacity.

<Test for Charge and Storage at High Temperature>

Next, in 85° C. constant-temperature bath, this coin-type cell was charged to 4.2 V of the charge termination voltage at 1 C constant current and constant voltage for 3 hours, and stored for 3 days as kept to 4.2 V in 85° C. constant-temperature bath. Then, the coin-type cell was put in 25° C. constant-temperature bath, and once discharged to 2.75 V of the cut-off voltage at 1 C constant current.

<Discharge Capacity after Charge and Storage at High Temperature>

Further, after that, the 0° C. discharge capacity after charge and storage at high temperature was obtained similarly to the measurement of the initial discharge capacity.

<Properties at Low Temperature after Charge and Storage at High Temperature>

Low temperature properties after charge and storage at high temperature was obtained from the 0° C. discharge capacity retention described below.

0° C. discharge capacity retention after charge and storage at high temperature (%)=(0° C. discharge capacity after charge and storage at high temperature/initial 0° C. discharge capacity)×100

The properties of the cell are listed in Table 1.

TABLE 1

| | Composition of electrolytic salt Composition of nonaqueous electrolytic solution (Volume ratio of solvent) | Compound | Addition amount (Content in nonaqueous electrolytic solution (wt %)) | 0° C. discharge capacity retention after charge and storage at high temperature 85° C. (%) |
|---|---|---|---|---|
| Example 1 | 1M LiPF6 EC/MEC/DEC (30/20/50) | methacrylate-O-CH2CH2-NCO | 1 | 74 |
| Example 2 | 1M LiPF6 EC/VC/MEC/DEC (28/2/20/50) | methacrylate-O-CH2CH2-NCO | 0.1 | 74 |
| Example 3 | 1M LiPF6 EC/VC/MEC/DEC (28/2/20/50) | methacrylate-O-CH2CH2-NCO | 1 | 79 |
| Example 4 | 1M LiPF6 EC/VC/MEC/DEC (28/2/20/50) | methacrylate-O-CH2CH2-NCO | 3 | 78 |
| Example 5 | 1M LiPF6 EC/VC/MEC/DEC (28/2/20/50) | methacrylate-O-CH2CH2-NCO | 7 | 77 |
| Example 6 | 1M LiPF6 EC/VC/MEC/DEC (28/2/20/50) | acetate-O-CH2CH2-NCO | 1 | 73 |
| Example 7 | 1M LiPF6 EC/VC/MEC/DEC (28/2/20/50) | benzoate-O-CH2CH2-NCO | 1 | 71 |

TABLE 1-continued

| | Composition of electrolytic salt Composition of nonaqueous electrolytic solution (Volume ratio of solvent) | Compound | Addition amount (Content in nonaqueous electrolytic solution (wt %)) | 0° C. discharge capacity retention after charge and storage at high temperature 85° C. (%) |
|---|---|---|---|---|
| Example 8 | 1M LiPF6 EC/VC/MEC/DEC (28/2/20/50) | methacrylate-O-CH2CH2-O-CH2CH2-NCO | 1 | 76 |
| Example 9 | 1M LiPF6 EC/VC/MEC/DEC (28/2/20/50) | OCN-CH2CH2-O-C(=O)-O-CH2CH2-NCO | 1 | 77 |
| Example 10 | 1M LiPF6 EC/PC/VC/MEC/DEC (25/3/2/20/50) | methacrylate-O-CH2CH2-NCO | 1 | 81 |
| Example 11 | 1M LiPF6 EC/VC/EEC/MEC/DEC (26/2/2/20/50) | methacrylate-O-CH2CH2-NCO | 1 | 83 |
| Example 12 | 1M LiPF6 + 0.05M LiN(SO2CF3)2 EC/VC/FEC/MEC/DEC (18/2/10/20/50) | methacrylate-O-CH2CH2-NCO | 1 | 84 |
| Example 13 | 1M LiPF6 + 0.1M LiPO2F2 EC/VC/FEC/MEC/DEC (18/2/10/20/50) | methacrylate-O-CH2CH2-NCO | 1 | 85 |
| Example 14 | 1M LiPF6 + 0.1M Lithium difluorobis [oxalate-O.O'] phosphate EC/VC/FEC/MEC/DEC (18/2/10/20/50) | methacrylate-O-CH2CH2-NCO | 1 | 83 |
| Example 15 | 1M LiPF6 EC/VC/MEC/DEC (28/2/20/50) +Adiponitrile; 1 wt % | methacrylate-O-CH2CH2-NCO | 1 | 84 |
| Example 16 | 1M LiPF6 EC/VC/MEC/DEC (28/2/20/50) +1,3-propane sultone; 0.5 wt % | methacrylate-O-CH2CH2-NCO | 1 | 83 |
| Comparative Example 1 | 1M LiPF6 EC/VC/MEC/DEC (28/2/20/50) | None | — | 61 |
| Comparative Example 2 | 1M LiPF6 EC/VC/MEC/DEC (28/2/20/50) | OCN-(CH2)4-NCO | 1 | 62 |
| Comparative Example 3 | 1M LiPF6 EC/VC/MEC/DEC (28/2/20/50) | CH3CH2-NCO | 1 | 61 |

TABLE 1-continued

| | Composition of electrolytic salt Composition of nonaqueous electrolytic solution (Volume ratio of solvent) | Compound | Addition amount (Content in nonaqueous electrolytic solution (wt %)) | 0° C. discharge capacity retention after charge and storage at high temperature 85° C. (%) |
|---|---|---|---|---|
| Comparative Example 4 | 1M LiPF6 EC/VC/MEC/DEC (28/2/20/50) | 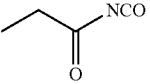 | 1 | 64 |

Example 17 and Comparative Example 5

Silicon (simple substance) (negative electrode active material) was used instead of the negative electrode active materials used in Example 3 and Comparative Example 1, to manufacture the negative electrode sheet. 80 mass % of silicon (simple substance) and 15 mass % of acetylene black (conductive material) were mixed, and added to a solution in which 5 mass % of polyvinylidene fluoride (binder) was dissolved in 1-methyl-2-pyrrolidone in advance, and mixed, to prepare a paste of the negative electrode mixture. This paste of the negative electrode mixture was applied onto a copper foil (current collector), dried, pressure treated, and punched to a desired size, to manufacture a negative electrode sheet. Other steps were performed similarly to Example 3 and Comparative Example 1 except that FEC was used instead of VC in the nonaqueous electrolytic solution, to manufacture a coin-type cell, and evaluations for the cell were performed. The results are listed in Table 2.

Example 18, and Comparative Example 6

LiFePO₄ (positive electrode active material) coated with amorphous carbon was used instead of the positive electrode active materials used in Example 3 and Comparative Example 1, to manufacture a positive electrode sheet. 90 mass % of LiFePO₄ coated with amorphous carbon and 5 mass % of acetylene black (conductive material) were mixed, and added to a solution in which 5 mass % of polyvinylidene fluoride (binder) was dissolved in 1-methyl-2-pyrrolidone in advance, and mixed, to prepare a paste of the positive electrode mixture. This paste of the positive electrode mixture was applied onto one face of an aluminum foil (current collector), dried, pressure treated, and punched to a desired size, to manufacture a positive electrode sheet. The charge termination voltage was 3.6 V and the discharge cut-off voltage was 2.0 V in the battery evaluations. Other steps were performed similarly to Example 3 and Comparative Example 1 to manufacture a coin-type cell, and evaluations for the cell were performed. The results are listed in Table 3.

TABLE 2

| | Composition of electrolytic salt Composition of nonaqueous electrolytic solution (Volume ratio of solvent) | Compound | Addition amount (Content in nonaqueous electrolytic solution (wt %)) | 0° C. discharge capacity retention after charge and storage at high temperature 85° C. (%) |
|---|---|---|---|---|
| Example 17 | 1M LiPF6 EC/FEC/MEC/DEC (28/2/20/50) | 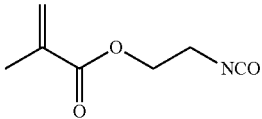 | 1 | 72 |
| Comparative Example 5 | 1M LiPF6 EC/FEC/MEC/DEC (28/2/20/50) | None | — | 48 |

TABLE 3

| | Composition of electrolytic salt Composition of nonaqueous electrolytic solution (Volume ratio of solvent) | Compound | Addition amount (Content in nonaqueous electrolytic solution (wt %)) | 0° C. discharge capacity retention after charge and storage at high temperature 85° C. (%) |
|---|---|---|---|---|
| Example 18 | 1M LiPF6 EC/VC/MEC/DEC (28/2/20/50) | 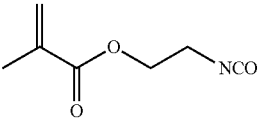 | 1 | 75 |
| Comparative Example 6 | 1M LiPF6 EC/VC/MEC/DEC (28/2/20/50) | None | — | 58 |

Any of the lithium secondary cells of Examples 1 to 16 described above prominently improves the electrochemical properties in a broad temperature range in comparison to the lithium secondary cell of Comparative Example 1 that does not contain the compound in the nonaqueous electrolytic solution of the present invention, or the lithium secondary cells of Comparative Examples 2 to 4 that contain a nonaqueous electrolytic solution to which the compound having an isocyanate group described in Patent Document 1 and Patent Document 2 is added. From those described above, it was revealed that the effects of the present invention were unique effects when the nonaqueous electrolytic solution in which an electrolytic salt was dissolved in a nonaqueous solvent contained the specific compound of the present invention in 0.001 to 10 mass %.

In addition, similar effects are exerted when using silicon (simple substance) for the negative electrode from the comparison of Example 17 with Comparative Example 5, and when using the lithium-containing olivine-type phosphoric acid iron salt (LiFePO$_4$) for the positive electrode from the comparison of Example 18 with Comparative Example 6. Accordingly, it is confirmed that the effects of the present invention are not effects depending on a specific positive electrode or negative electrode.

Furthermore, the nonaqueous electrolytic solution of the present invention also has effects of improving the discharge property in a broad temperature range of a lithium primary cell.

INDUSTRIAL APPLICABILITY

By using the nonaqueous electrolytic solution of the present invention, it is possible to obtain an energy storage device that is excellent in the electrochemical properties in a broad temperature range. Particularly, when the nonaqueous electrolytic solution of the present invention is used as a nonaqueous electrolytic solution for an energy storage device loaded in a hybrid electric automobile, a plug-in hybrid electric automobile, or a battery electric automobile etc., it is possible to obtain an energy storage device of which the electrochemical properties hardly decline in a broad temperature range.

The invention claimed is:
1. A nonaqueous electrolytic solution, comprising:
a nonaqueous solvent;
an electrolyte salt dissolved in the nonaqueous solvent; and
from 0.001 to 10 mass % of an isocyanate compound of the formula (I):

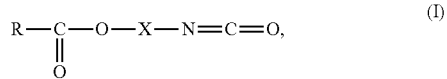

wherein R represents a $C_1$ to $C_6$ alkyl group optionally substituted with a fluorine atom, a $C_2$ to $C_6$ alkenyl group optionally substituted with a fluorine atom, a $C_6$ to $C_{12}$ aryl group optionally substituted with a fluorine atom, a $C_1$ to $C_6$ alkyloxy group optionally substituted with a fluorine atom, a $C_2$ to $C_6$ alkenyloxy group optionally substituted with a fluorine atom, a $C_2$ to $C_6$ isocyanatoalkyloxy group optionally substituted with a fluorine atom, or a $C_6$ to $C_{12}$ aryloxy group optionally substituted with a fluorine atom, and X represents a $C_1$ to $C_6$ linear or branched alkylene group optionally substituted with a fluorine atom, or a $C_2$ to $C_6$ bivalent linking group comprising at least one ether bond.

2. The nonaqueous electrolytic solution of claim 1, wherein R is a $C_1$ to $C_6$ alkyl group optionally substituted with a fluorine atom or a $C_2$ to $C_6$ alkenyl group optionally substituted with a fluorine atom.

3. The nonaqueous electrolytic solution of claim 2, wherein R is a $C_2$ to $C_6$ alkenyl group or a $C_2$ to $C_6$ isocyanatoalkyloxy group.

4. The nonaqueous electrolytic solution of claim 1, wherein X is a $C_1$ to $C_6$ linear or branched alkylene group optionally substituted with a fluorine atom.

5. The nonaqueous electrolytic solution of claim 1, wherein the isocyanate compound is at least one member selected from the group consisting of 2-isocyanatoethyl acrylate, 2-isocyanatoethyl methacrylate, 2-isocyanatoethyl crotonate, 2-(2-isocyanatoethoxy)ethyl acrylate, 2-(2-isocyanatoethoxy)ethyl methacrylate, 2-(2-isocyanatoethoxy)ethyl crotonate, and bis(2-isocyanatoethyl)carbonate.

6. The nonaqueous electrolytic solution of claim 1, wherein the nonaqueous solvent comprises a cyclic carbonate and a chain ester.

7. The nonaqueous electrolytic solution of claim 6, wherein the cyclic carbonate is at least one member selected from the group consisting of a cyclic carbonate having an unsaturated bond, a cyclic carbonate having a fluorine atom, ethylene carbonate, propylene carbonate, 1,2-butylene carbonate, and 2,3-butylene carbonate.

8. The nonaqueous electrolytic solution of claim 6, wherein the cyclic carbonate comprises a cyclic carbonate having a unsaturated bond that is a carbon-carbon double bond or a carbon-carbon triple bond and a cyclic carbonate having a fluorine atom.

9. The nonaqueous electrolytic solution of claim 6, wherein the chain ester is at least one member selected from the group consisting of an asymmetric chain carbonate, a symmetric chain carbonate, and a chain carboxylic acid ester.

10. The nonaqueous electrolytic solution of claim 6, further comprising:
0.001 to 5 mass % of at least one of a nitrile compound and a sultone compound.

11. An energy storage device, comprising:
a positive electrode;
a negative electrode; and
the nonaqueous electrolytic solution of claim 6.

12. The nonaqueous electrolytic solution of claim 1, further comprising:
001 to 5 mass % of at least one of a nitrile compound and a sultone compound.

13. The nonaqueous electrolytic solution of claim 12, wherein each of the nitrile compound and the sultone compound is included in an amount of from 0.005 to 1 mass %.

14. The nonaqueous electrolytic solution of claim 1, wherein the electrolytic salt is a lithium salt or an onium salt.

15. An energy storage device, comprising:
a positive electrode;
a negative electrode; and
the nonaqueous electrolytic solution of claim 14.

16. The nonaqueous electrolytic solution of claim 1, wherein the electrolytic salt comprises at least one member selected from the group consisting of LiPF$_6$, LiPO$_2$F$_2$, Li$_2$PO$_3$F, LiBF$_4$, LiN(SO$_2$CF$_3$)$_2$, LiN(SO$_2$C$_2$F$_5$)$_2$, LiN ($SO_2F)_2$, lithium difluorobis[oxalate-O,O'] phosphate, and lithium tetrafluoro[oxalate-O,O'] phosphate.

17. The nonaqueous electrolytic solution of claim 1, wherein a concentration of the electrolytic salt is 0.3 to 2.5 M with respect to the nonaqueous solvent.

18. An energy storage device, comprising:
a positive electrode;
a negative electrode; and
the nonaqueous electrolytic solution of claim 1.

19. The energy storage device of claim 18, wherein the positive electrode comprises a positive electrode active material comprising at least one member selected from the group consisting of a lithium complex metal oxide and a lithium-containing olivine-type phosphoric acid salt.

20. The energy storage device of claim 18, wherein the negative electrode comprises a negative electrode active material comprising at least one member selected from the group consisting of lithium metal, a lithium alloy, a carbon material which can absorb and release lithium, and a metal compound which can absorb and release lithium.

* * * * *